United States Patent [19]

Takeshima et al.

[11] Patent Number: 5,365,733
[45] Date of Patent: Nov. 22, 1994

[54] EXHAUST GAS PURIFICATION SYSTEM FOR AN INTERNAL COMBUSTION ENGINE

[75] Inventors: Shinichi Takeshima, Susono; Toshiaki Tanaka, Numazu; Tokuta Inoue, Mishima, all of Japan

[73] Assignee: Toyota Jidosha Kabushiki Kaisha, Toyota, Japan

[21] Appl. No.: 60,375

[22] Filed: May 7, 1993

Related U.S. Application Data

[63] Continuation of Ser. No. 709,000, May 21, 1991, Pat. No. 5,233,830.

[30] Foreign Application Priority Data

May 28, 1990 [JP] Japan ................. 2-135233

[51] Int. Cl.⁵ ................................ F01N 3/28
[52] U.S. Cl. .......................... 60/278; 60/288; 60/301; 422/171
[58] Field of Search ................ 60/288, 278, 301; 422/171

[56] References Cited

U.S. PATENT DOCUMENTS 4,297,328 10/1981 Ritscher ..................... 60/301

FOREIGN PATENT DOCUMENTS

| | | | |
|---|---|---|---|
| 2259946 | 6/1974 | Germany | 60/288 |
| 139145 | 5/1989 | Japan . | |
| 1334797 | 10/1973 | United Kingdom | 60/301 |
| 1347542 | 2/1974 | United Kingdom | 60/301 |

Primary Examiner—Douglas Hart
Attorney, Agent, or Firm—Kenyon & Kenyon

[57] ABSTRACT

An exhaust gas purification system for an internal combustion engine includes a dual passage portion having a first passage and a second passage which are connected in parallel to each other. In the first passage, a first catalyst constructed of lean NOx catalyst is located and further a second catalyst constructed of oxidizing catalyst or three-way catalyst is located downstream of the first catalyst. In the second passage, a third catalyst constructed of oxidizing or three-way catalyst is located. A flow switching valve is provided so as to switch the flow of exhaust gas between the first passage and the second passage. The flow switching valve is switched so that exhaust gas flows through the third catalyst when the engine is being warmed-up and flows through the first catalyst and the second catalyst after the engine has been warmed-up.

8 Claims, 7 Drawing Sheets

EXHAUST GAS PURIFICATION SYSTEM FOR AN INTERNAL COMBUSTION ENGINE

This application is a continuation of application Ser. No. 07/709,000, filed on May 25, 1991, now U.S. Pat. No. 5,233,830.

BACKGROUND OF THE INVENTION

1. Field of the Invention

The present invention relates to an exhaust gas purification system for an internal combustion engine which can purify nitrogen oxides (NOx), hydrocarbons (HC), and carbon monoxide (CO) included in exhaust gas from an internal combustion engine both when the engine is being warmed-up and after the engine has been warmed-up.

2. Description of the Prior Art

Combustion at lean air-fuel ratios (lean burn) is effective to improve fuel economy of automobile internal combustion engines. However, in the lean burn engine, NOx reduction by a three-way catalyst cannot be expected, and therefore, an alternative means for reducing NOx needs to be developed.

As a catalyst capable of reducing NOx even under an oxidizing exhaust gas condition of the lean burn engines, Japanese Patent Publication HEI 1-130735 discloses a zeolite catalyst carrying transition metals which can reduce NOx in the presence of hydrocarbons (hereinafter, a lean NOx catalyst).

Also, Japanese Patent Publication HEI 1-139145 discloses a catalyst arrangement wherein an oxidizing catalyst or a three-way catalyst is arranged downstream of a lean NOx catalyst located in an exhaust conduit of an internal combustion engine so that HC and CO emissions which have passed through the lean NOx catalyst without being purified can be purified by the oxidizing or three-way catalyst.

However, in the prior art catalyst arrangement, since the oxidizing or three-way catalyst is located relatively far from the engine because of the lean NOx catalyst located between the engine and the oxidizing or three-way catalyst, and since temperature of exhaust gas itself is relatively low due to the lean burn, the oxidizing or three-way catalyst cannot be quickly warmed-up. As a result, the oxidizing or three-way catalyst cannot effectively purify HC and CO emissions during the warming-up of the engine, though a relatively large amount of HC and CO emissions is included in the gas flowing from the engine to the catalyst during the warming-up.

SUMMARY OF THE INVENTION

An object of the invention is to provide an exhaust gas purification system for an internal combustion engine wherein HC and CO emissions can be effectively purified even when the engine is being warmed-up as well as after the engine has been warmed-up.

This object can be attained by an exhaust gas purification system for an internal combustion engine in accordance with the present invention. The system includes an internal combustion engine capable executing fuel combustion at lean air-fuel ratios and having an exhaust manifold, an exhaust gas conduit connected to the exhaust manifold and having a dual passage portion located downstream of and close to the exhaust manifold, the dual passage portion including a first passage and a second passage which are connected in parallel to each other, a first catalyst installed in the first passage and constructed of zeolite carrying at least one metal selected from the group consisting of transition metals and noble metals to reduce nitrogen oxides included in exhaust gas from the engine under oxidizing conditions and in the presence of hydrocarbons, a second catalyst installed in the first passage downstream of the first catalyst and constructed of any one of a three-way catalyst and an oxidizing catalyst, a third catalyst installed in the second passage and constructed of any one of a three-way catalyst and an oxidizing catalyst, a flow switching valve for switching exhaust gas flow from the exhaust manifold between the first passage and the second passage, and valve control means for switching the flow switching valve so as to cause exhaust gas to flow through the second passage while the engine is being warmed-up and to cause exhaust gas to flow through the first passage after the engine has been warmed-up.

In a warming-up period of the engine, exhaust gas is caused to flow through the third catalyst of three-way or oxidizing catalyst so that HC and CO emissions are effectively purified, even though the exhaust gas includes a large amount of HC and CO emissions in such a period. After the engine has been warmed-up, exhaust gas is caused to flow through the first catalyst of lean NOx catalyst where NOx is purified and then flow through the second catalyst of three-way or oxidizing catalyst where the remaining HC and CO emissions having passed through the lean NOx catalyst without being purified are purified. Since the second catalyst has by this time been sufficiently warmed-up, the purification ability of the second catalyst is also high.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 1:
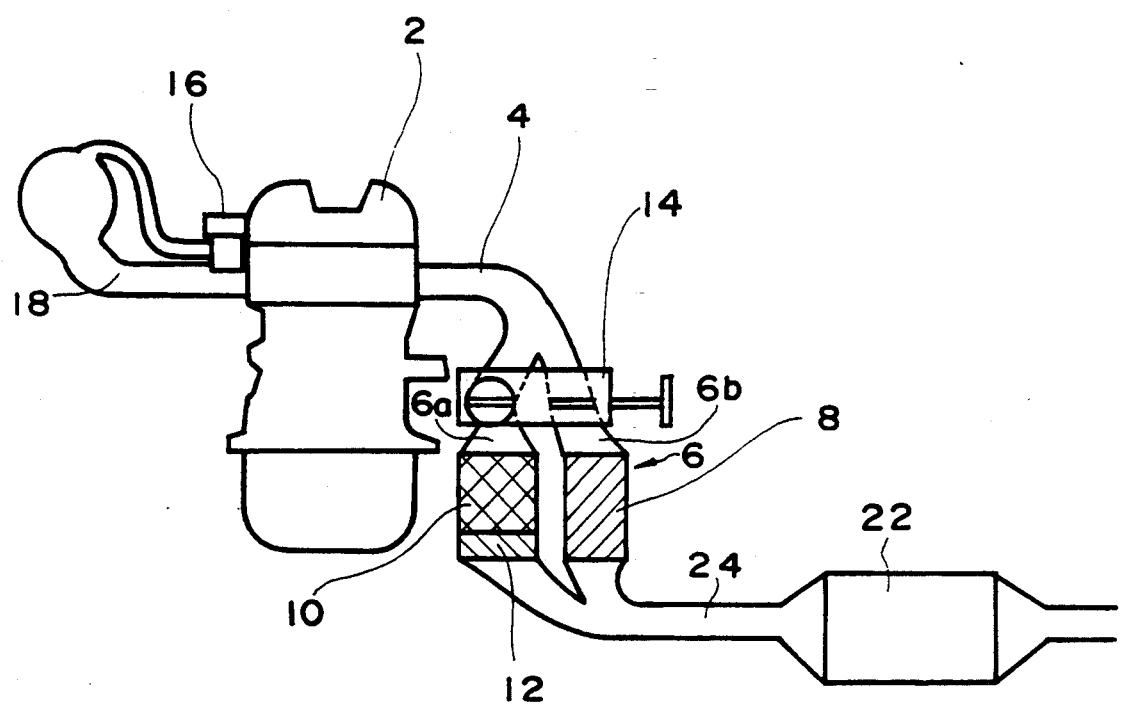
FIG. 1 is a schematic system diagram of an exhaust gas purification system of an internal combustion engine in accordance with a first embodiment of the present invention.

FIG. 1 illustrates an arrangement of an exhaust gas purification system in accordance with a first embodiment of the invention. As illustrated in FIG. 1, a dual passage portion 6 is provided in an exhaust conduit 24 of an internal combustion engine 2 capable of fuel combustion at lean air-fuel ratios. The dual passage portion 6 is located downstream of and close to an exhaust manifold 4 of the engine. The dual passage portion 6 includes a first passage 6a and a second passage 6b which are connected in parallel to each other. In the first embodiment, the first passage 6a and the second passage 6b are separate from each other at the longitudinally intermediate portions of the first and second passages 6a and 6b.

In the first passage 6a, a first catalyst 10 constructed of lean NOx catalyst is installed and a second catalyst 12 constructed of either a three-way or an oxidizing catalyst is further installed downstream of the first catalyst 10. In this instance, a lean NOx catalyst is defined as a catalyst constructed of zeolite carrying at least one metal selected from the group consisting of transition metals and noble metals to reduce nitrogen oxides included in exhaust gas from the engine under oxidizing conditions and in the presence of hydrocarbons. In the second passage 6b, a third catalyst 8 constructed of either a three-way or an oxidizing catalyst is installed.

A flow switching valve 14 for switching the exhaust gas flow between the first passage 6a and the second passage 6b is installed at an upstream side connecting portion of the first passage 6a and the second passage 6b. The flow switching valve 14 is coupled to a valve actuator which is electrically connected to and is operated by a micro computer (valve control means) for controlling the switching operation of the flow switching valve 14. The computer includes an input/output interface, a central processor unit for executing calculation, a read only memory storing various programs including routines of FIGS. 7, 8, 9, and 12, and a random access memory. The computer controls the flow switching valve 14 so that the flow switching valve 14 causes exhaust gas to flow through the second passage 6b while the engine is being warmed-up and causes exhaust gas to flow through the first passage 6a after the engine has been warmed-up.

An engine recirculation system 16 is also provided so that a portion of exhaust gas is recirculated to an intake manifold 18 of the engine. A fourth catalyst 22 constructed of a three-way catalyst may be installed in a portion of the exhaust conduit downstream of the dual passage portion 6.

FIGS. 2–6 illustrate arrangements of exhaust gas purification systems in accordance with a second embodiment and a third embodiment of the invention. Since the second embodiment and the third embodiment differ from the first embodiment in the structures of the dual passage portions thereof only, explanation of the portions of the second embodiment and the third embodiment having the same structures as those of the first embodiment will be omitted by denoting like reference numerals, and the different portions only will be explained below.

Figure 2:
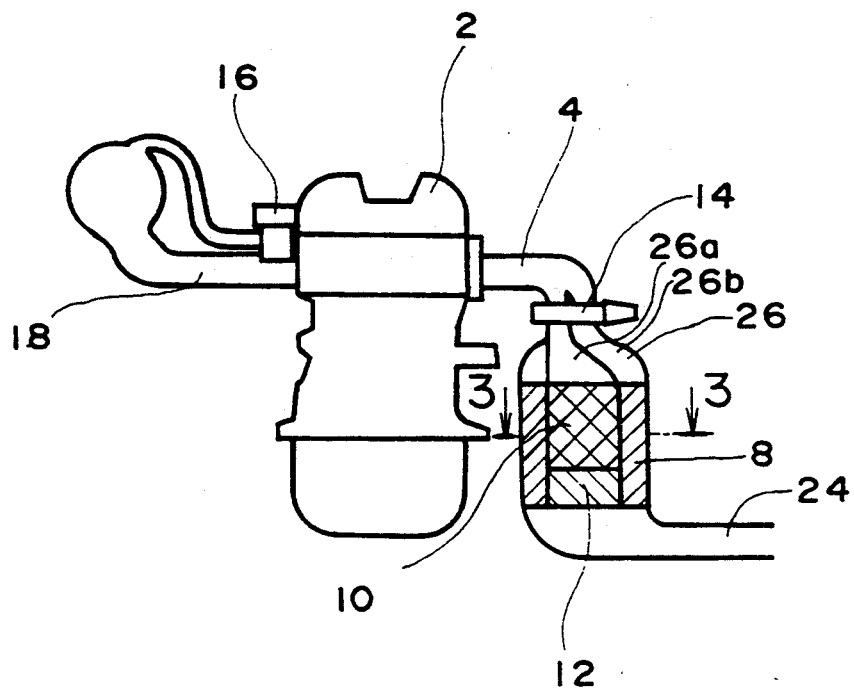
FIG. 2 is a schematic system diagram of an exhaust gas purification system of an internal combustion engine in accordance with a second embodiment of the present invention.
Figure 3:
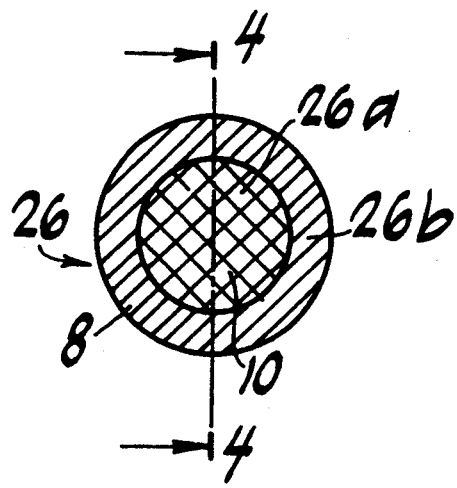
FIG. 3 is a cross-sectional view of a catalyst portion of the system of FIG. 2 taken along line 3—3.
Figure 4:
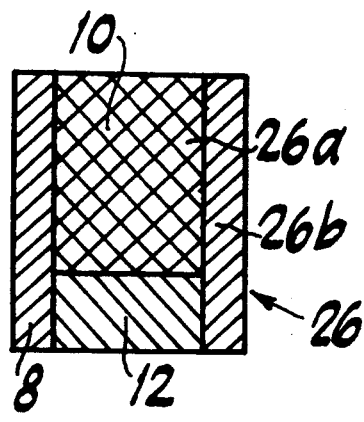
FIG. 4 is a cross-sectional view of the catalyst portion of FIG. 3 taken along line 4—4.

In the second embodiment, shown in FIGS. 2–4, a dual passage portion 26, which corresponds to the dual passage portion 6 of the first embodiment, is provided downstream of and close to the exhaust manifold 4 of the engine 2. The dual passage portion 26 includes a first passage 26a and a second passage 26b which are connected in parallel to each other. The first passage 26a and the second passage 26b contact each other, and the second passage 26b surrounds the first passage 26a. In the first passage 26a, the first catalyst 10 constructed of lean NOx catalyst is installed and the second catalyst 12 constructed of either three-way or oxidizing catalyst is installed downstream of the first catalyst 10. In the second passage 26b, the third catalyst 8 constructed of either three-way or oxidizing catalyst is installed.

Figure 5:
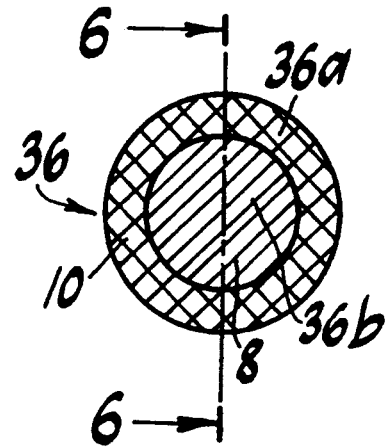
FIG. 5 is a transverse, cross-sectional view of a catalyst portion of an exhaust gas purification system of an internal combustion engine in accordance with a third embodiment of the present invention.
Figure 6:
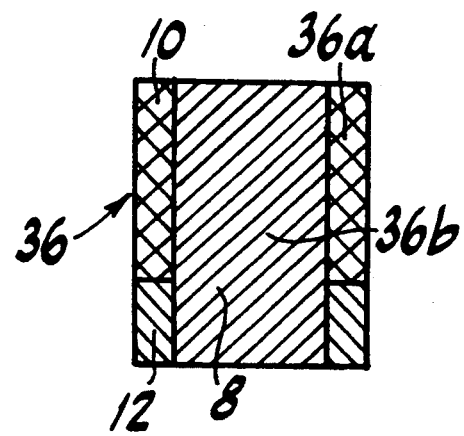
FIG. 6 is a cross-sectional view of the catalyst portion of FIG. 5 taken along line 6—6.

In the third embodiment, shown in FIGS. 5 and 6, a dual passage portion 36, which corresponds to the dual passage portion 6 of the first embodiment, is provided downstream of and close to the exhaust manifold 4 of the engine 2. The dual passage portion 36 includes a first passage 36a and a second passage 36b which are connected in parallel to each other. The first passage 36a and the second passage 36b contact each other, and the first passage 36a surrounds the second passage 36b. In the first passage 36a, the first catalyst 10 constructed of lean NOx catalyst is installed, and the second catalyst 12 constructed of either three-way or oxidizing catalyst is installed downstream of the first catalyst 10. In the second passage 36b, the third catalyst 8 constructed of either three-way or oxidizing catalyst is installed.

Figure 10:
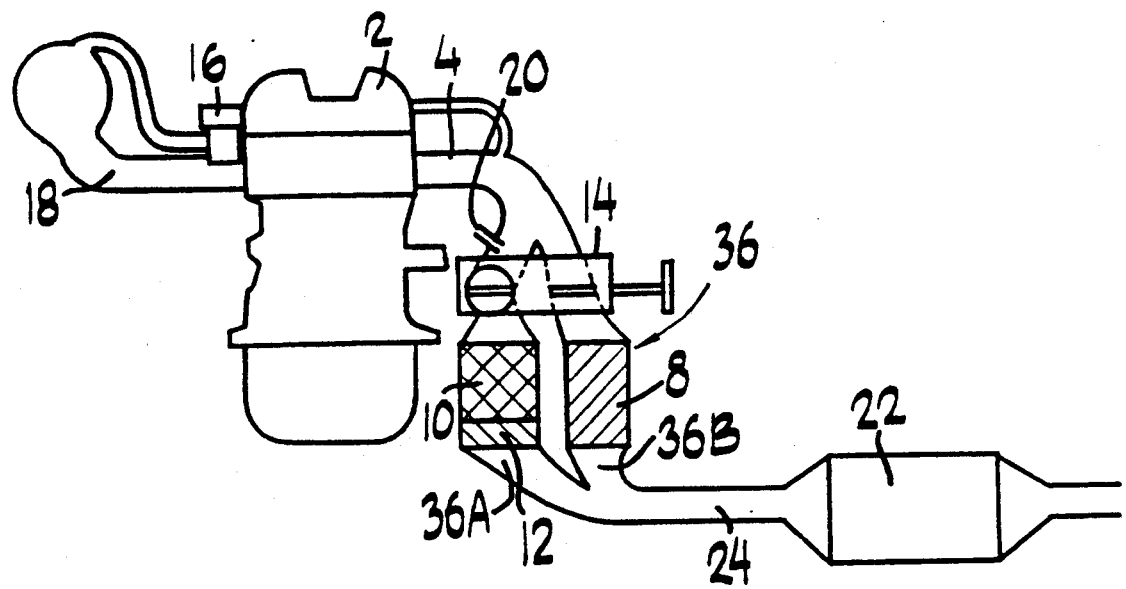
FIG. 10 is a schematic system diagram of an exhaust gas purification system of an internal combustion engine in accordance with a fourth embodiment of the present invention.

Since the first passage and the second passage contact each other in the second embodiment and the third embodiment, the dual passage portions 26 and 36 of the second and third embodiments are more compact in size than the dual passage portion 6 of the first embodiment, FIG. 10 illustrates an arrangement of an exhaust gas purification system in accordance with a fourth embodiment of the invention. Since the fourth embodiment differs from the first embodiment in the structure of a secondary air introduction device only, explanation of the portions of the fourth embodiment having the same structures as those of the first embodiment will be omitted by denoting like reference numerals, and the different portions only will be explained below.

In the fourth embodiment, a secondary air introduction port 20 is provided in the first passage 6a of the dual passage portion 6 upstream of the first catalyst 10 constructed of lean NOx catalyst. Secondary air is introduced for a predetermined period of time after stopping of the engine through the secondary air introduction port 20 so that water is prevented from being condensed on the first catalyst 10 of lean NOx catalyst from vapour included in the exhaust gas.

Next, control for EGR, control for fuel injection, control for switching of the switching valve 14, and control for introduction of secondary air will be explained below in that order.

Figure 7:
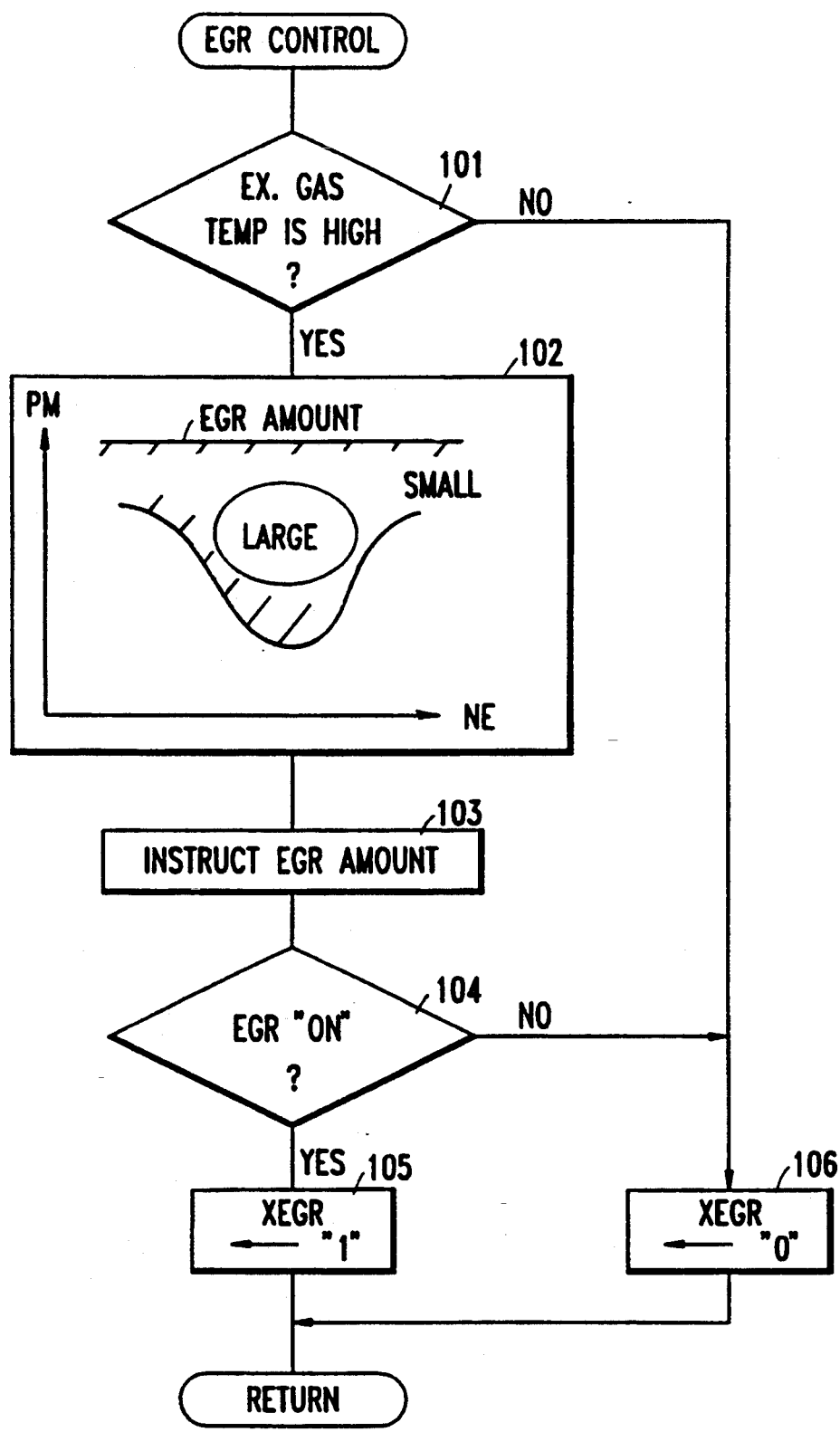
FIG. 7 is a flow chart for EGR control.

FIG. 7 illustrates a routine for controlling EGR. The amount of EGR affects a fuel injection amount modification factor KLEAN (which will be described hereinafter) which in turn affects an air-fuel ratio, a NOx amount, HC and CO emissions, and a switching timing of the flow switching valve 14. The routine of FIG. 7 is entered at intervals of predetermined periods of time. At step 101, it is determined whether or not the current exhaust gas temperature is higher than a predetermined temperature, for example 450° C. When the current exhaust gas temperature is determined to be lower than the predetermined temperature, the routine proceeds to step 106 where flag XEGR is set to "0" and then returns, because EGR should not be executed at low temperatures including engine start-up and idling conditions. When the current exhaust gas temperature is determined to be higher than predetermined temperature, the routine proceeds to step 102.

At step 102, an opening degree of an EGR valve (not shown) is determined on the basis of an intake pressure (PM) versus engine speed (NE) map shown in a rectangle of step 102. The opening degree of the EGR valve is selected to be zero at high engine loads (at high intake pressures) and at low engine loads (at low intake pressures) because no EGR is required at such high and low loads. EGR is executed at medium engine loads (hatched portion of the map shown in the rectangle of step 102) and the opening degree of the EGR valve is selected large at a center portion of the hatched portion.

At step 103, the opening degree obtained at step 102 is fed to a step motor (not shown) for opening and closing the EGR valve of the EGR device 16. Then, at step 104, it is determined whether or not the EGR is in the state of "ON". When it is determined that the EGR is in an "ON" state, the routine proceeds to step 105, where the EGR flag XEGR is set to "1". When it is determined that the EGR is in an "OFF" state at step 104, the routine proceeds to step 106, where the EGR flag XEGR is set to "0". The EGR flag XEGR will be used in the routine of FIG. 8.

Figure 8:
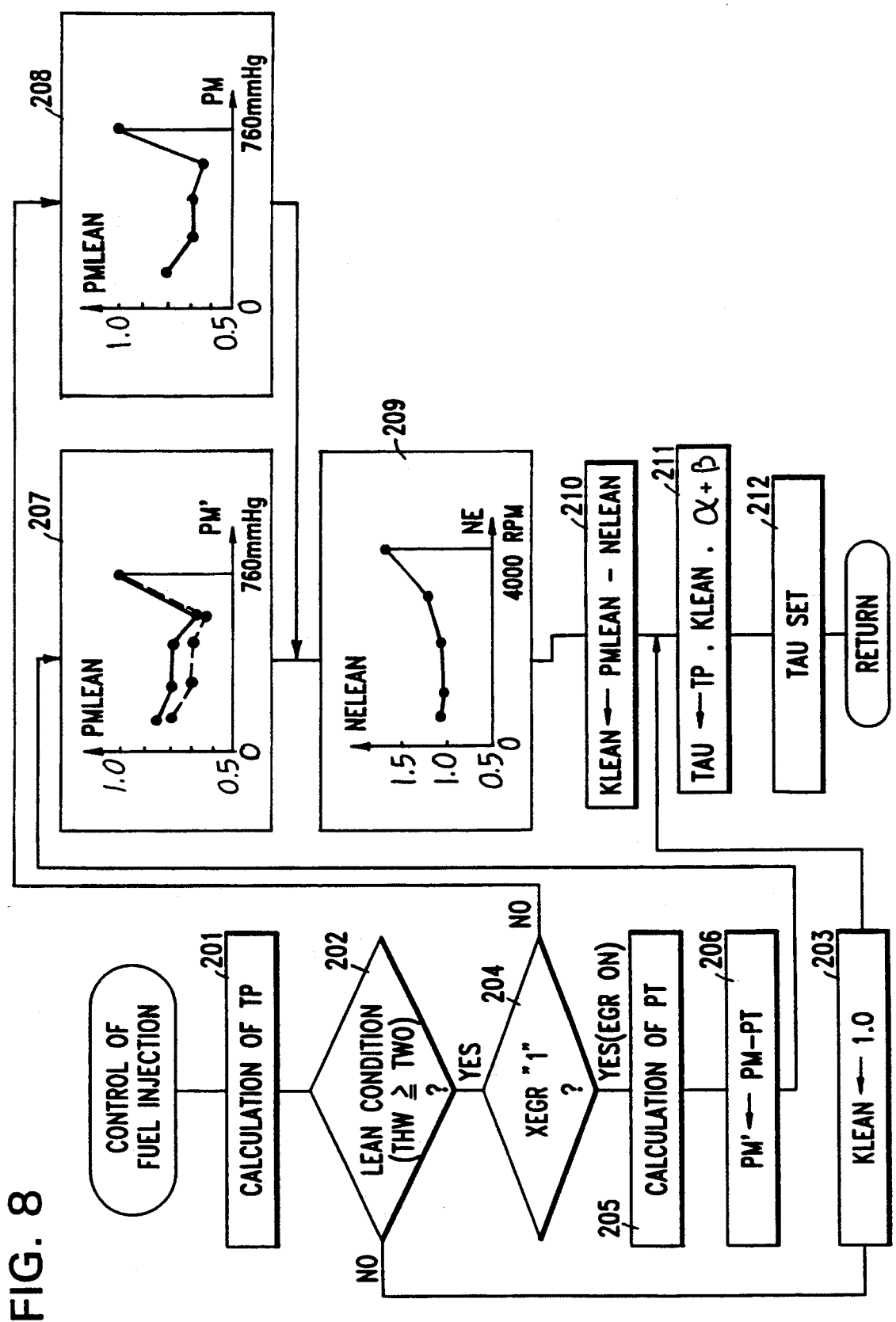
FIG. 8 is a flow chart for fuel injection control.

FIG. 8 illustrates a routine for control of fuel injection, more particularly, a routine for calculating an optimum fuel injection amount and executing the injection. This routine is entered at intervals of predetermined crank angles, for example at every 360° crank angle. At step 201, a basic fuel injection amount TP is calculated on the basis of an intake pressure (PM) versus engine speed (NE) map (not shown but known). Then, at step 202, it is determined whether or not the current engine operating condition is a lean operating condition where the engine is allowed to be operated at lean air/fuel ratios by determining, for example, whether or not the current engine cooling water temperature THW is higher than a predetermined temperature TWO. When the current engine operating condition is determined to be in the lean operating condition, the routine proceeds to step 204. In contrast, when the current engine operating condition is determined to not be in the lean operating condition, the routine proceeds to step 203 where a fuel injection amount modification factor KLEAN is set to 1.0 and then proceeds to step 211. In this connection, the factor KLEAN of 1.0 corresponds to the stoichiometric air-fuel ratio.

In a case where the current engine operating condition is in the lean operating condition at step 202 and therefore the routine proceeds to step 204, it is determined whether or not EGR is being executed by referring to the EGR flag XEGR. When EGR is being executed (that is, XEGR="1"), the routine proceeds to steps 205 to 207 where a fuel injection amount modification sub-factor PMLEAN is calculated. Contrarily, when EGR is in "OFF" (that is, XEGR="0"), the routine proceeds to step 208 where another fuel injection amount modification sub-factor PMLEAN is calculated.

At step 205, a pressure increment PT of the intake pressure PM due to execution of EGR is calculated. The pressure increment PT is dependent on the opening degree of the EGR valve and the engine speed NE. More particularly, PM changes in proportion to the opening degree of the EGR valve and in inverse proportion to the engine speed NE. For the purpose of calculating PT more exactly, a predetermined map may be used. Then, at step 206, an intake pressure component PM' of a newly suctioned intake gas (excluding EGR gas) is calculated by the following equation:

$$PM' = PM - PT$$

where,
PM is an intake pressure detected by a pressure sensor (not shown), and
PT is an increment of the intake pressure due to execution of EGR.

Then, at step 207, the fuel injection amount modification sub-factor PMLEAN is calculated on the basis of the above-obtained intake pressure component PM' using a PMLEAN versus PM' map shown in a rectangle of step 207.

When EGR is in an "OFF" state and therefore the routine proceeds to step 208, the PMLEAN is calculated on the basis of the detected intake pressure PM using a PMLEAN versus PM map shown in a rectangle of step 208.

As will be easily understood from comparison between the map of step 207 and the map of step 208, the PMLEAN for an EGR "ON" state (PMLEAN of step 207) is preset larger than the PMLEAN for an EGR "OFF" state (PMLEAN of step 208), so that the air-fuel ratio of the intake air/fuel mixture is controlled to be relatively rich in the EGR "ON" state.

Then, at step 209, the fuel injection amount modification sub-factor NELEAN is calculated on the basis of the current engine speed NE using an NELEAN versus NE map shown in a rectangle of step 209.

Then, at step 210, a fuel injection amount modification factor KLEAN is calculated by the following equation:

$$KLEAN = PMLEAN \times NELEAN$$

Then, at step 211, a final fuel injection amount TAU is calculated by the following equation:

$$TAU = TP \times KLEAN \times A + B$$

where, A and B are modification factors determined based on other engine operating parameters. Then, at step 212, the fuel injection amount TAU is set and the fuel injection is executed for a fuel injection period of time corresponding to the amount TAU.

Figure 9:
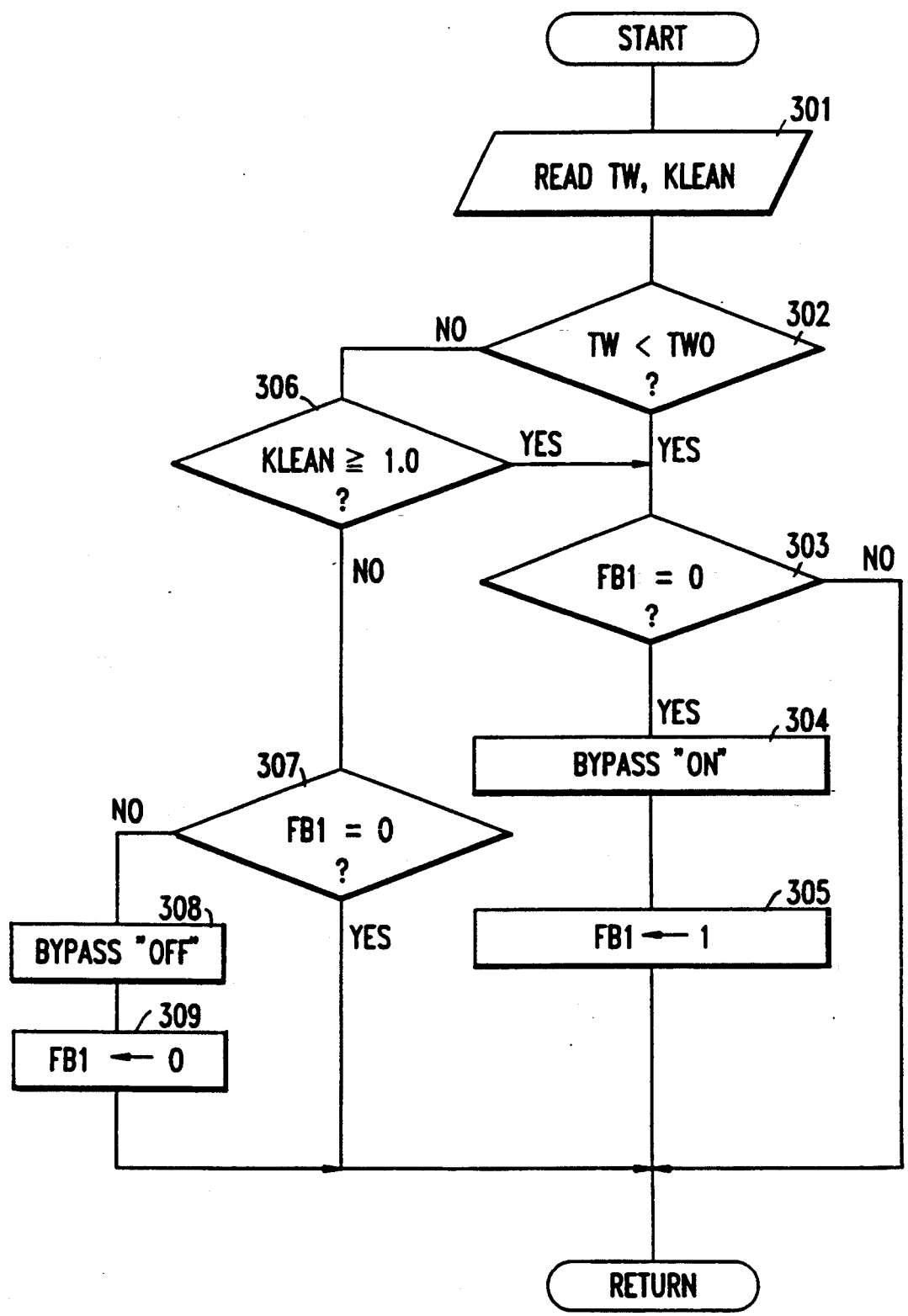
FIG. 9 is a flow chart for control of a flow switching valve.

The above-described fuel injection modification factor KLEAN is also used for control of switching of the flow switching valve 14 in accordance with a routine of FIG. 9.

FIG. 9 illustrates a routine for controlling switching of the flow switching valve 14. The routine of FIG. 9 is entered at intervals of predetermined periods of time. At step 301, the current engine cooling water temperature TW and the current fuel injection amount modification factor KLEAN are entered in the computer.

Then, at step 302, it is determined whether or not the current TW is smaller than a predetermined temperature TWO. When TW is determined to be smaller than TWO, the current engine operating condition is deemed to be in a warming-up condition and the routine proceeds to step 303 and then to steps 304 and 305. When TW is determined to not be smaller than TWO at step 302, the current engine operating condition is deemed to be in a warmed-up condition, and the routine proceeds to step 306.

With respect to a bypass flag FB1 shown in a rectangle of step 303, setting "1" (bypass "ON") of FB1 corresponds to a state where the exhaust gas bypasses the first catalyst 10 of lean NOx catalyst and flows through the third catalyst 8 of three-way or oxidizing catalyst, and setting "0" (bypass "OFF") of FB1 corresponds to a state where the exhaust gas flows through the first catalyst of lean NOx catalyst.

When the routine proceeds to step 303 and FB1 is determined to be not at "0", the routine returns without executing any action. When FB1 is determined to be at "0" at step 303 and therefore the exhaust gas is flowing through the lean NOx catalyst, the routine proceeds to step 304, where the flow switching valve 14 is switched to "ON" so that the exhaust gas flows through the third catalyst 8 of oxidizing or three-way catalyst. Then, the routine proceeds to step 305 where bypass flag FB1 is set to "1".

When the engine cooling water temperature TW is determined to be higher than the predetermined temperature TWO at step 302, the current engine operating condition is deemed to be in an already warmed-up condition, and the routine proceeds to step 306. At step 306, it is determined whether or not the fuel injection amount modification factor KLEAN is greater than 1.0. When KLEAN is determined to be greater than 1.0 at step 306, the current air-fuel ratio is deemed to be in a rich or stoichiometric condition. Therefore, the flow switching valve 14 is controlled in accordance with the steps 303 to 305 so that the exhaust gas flows through the third catalyst 8 of three-way or oxidizing catalyst.

When KLEAN is determined to not be greater than 1.0 at step 306, the engine is deemed to be operating at lean air-fuel ratios where the first catalyst of lean NOx catalyst can effectively purify NOx, and the routine proceeds to step 307.

At step 307, it is determined whether or not the bypass flag FB1 is at "0". When FB1 is determined to be at "0", the routine returns without executing any action because the exhaust gas is flowing through the first catalyst 10 of lean NOx catalyst. When FB1 is determined to not be at "0" at step 307, the routine proceeds to step 308, where the flow switching valve 14 is switched to "OFF" so that the exhaust gas flows through the first catalyst 10 of lean NOx catalyst. Then, the routine proceeds to step 309 where the bypass flag FB1 is set to "0".

Due to control of the flow switching valve 14 in accordance with the routine of FIG. 9 (valve control means), exhaust gas flows through the third catalyst 8 of three-way or oxidizing catalyst when the engine is being warmed-up (TW is smaller than TWO) and when the throttle valve is in a full-open state (KLEAN is equal to or larger than 1.0) even if the engine is in a warmed-up condition. In contrast, exhaust gas flows through the first catalyst 10 of lean NOx catalyst and the second catalyst 12 after the engine has been warmed-up (TW is equal to or larger than TWO) and the throttle valve is not in a full-open state (KLEAN is smaller than 1.0).

The above-described control structures are applicable to the first to third embodiments.

Figure 11:
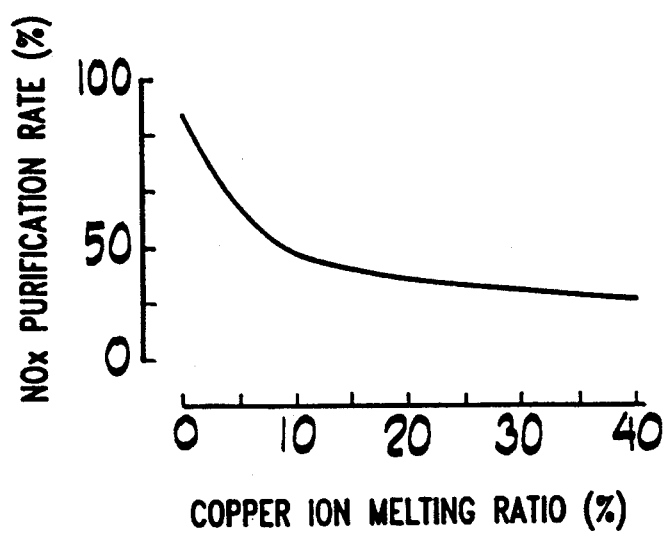
FIG. 11 is a graph illustrating a relationship between NOx purification rate and a ratio of melting-out of copper ion into condensate water on a lean NOx catalyst.
Figure 12:
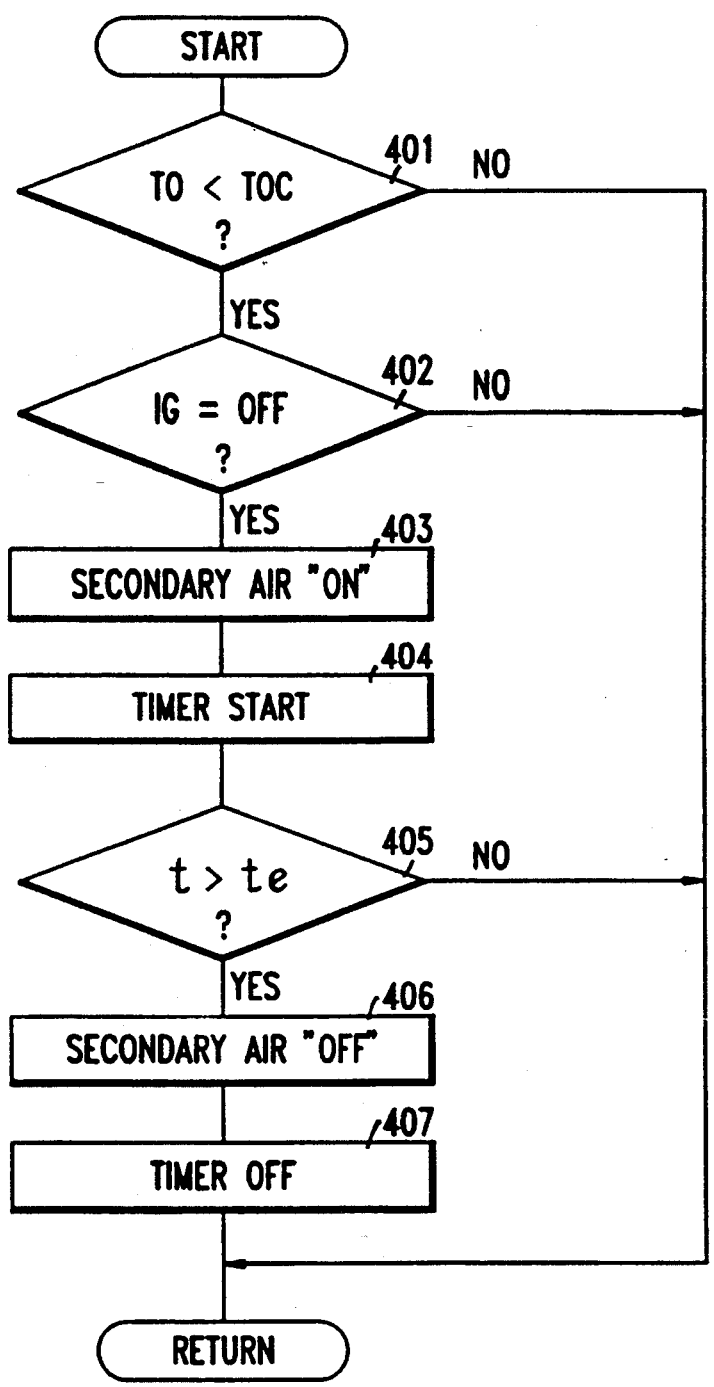
FIG. 12 is a flow chart for control of secondary air introduction.

FIG. 12 illustrates a routine for control for supply of secondary air which is applicable to the fourth embodiment of FIG. 10 only. The routine of FIG. 12 is a routine for control of supply of secondary air for the purpose of preventing vapour included in the exhaust gas remaining in the exhaust conduit after stopping of the engine from being condensed to generate water which will collect on the first catalyst 10 of lean NOx catalyst. If water collects on the lean NOx catalyst, copper ion carried by the zeolite of the lean NOx catalyst dissolves into the condensate water to degrade the NOx purification rate of the lean NOx catalyst as shown in FIG. 11. In this instance, the transition metal, for example, copper is carried In the form of ion by the zeolite of the lean NOx catalyst.

The routine of FIG. 12 is entered at intervals of predetermined periods of time. At step 401, it is determined whether the current ambient temperature TO detected by a temperature sensor (not shown) is lower than the dew-point temperature TOC of aqueous vapour. When the ambient temperature is determined to be higher than the dew-point temperature, the routine returns without executing any action, because vapour is not condensed on the lean NOx catalyst.

When the ambient temperature TO is determined to be lower than the dew-point temperature TOC at step 401, the routine proceeds to step 402, where it is determined whether or not an ignition key is turned to "OFF". When the ignition key is determined to not be turned to "OFF" at step 402, the routine returns without executing any action. In contrast, when the ignition key is determined to be turned to "OFF", the routine proceeds to step 403, where supply of secondary air is switched to "ON" so that secondary air is supplied through the secondary air introduction port 20 to a portion of the first passage upstream of the lean NOx catalyst. For the purpose of continuing the supply of secondary air for some period of time, the routine proceeds to step 404 where timer counting starts and then to step 405 where whether or not the counted time (t) exceeds a predetermined time (te) is determined. Until the increasing time (t) exceeds the predetermined time (te), the routine is repeatedly executed so that supply of secondary air continues.

When the increasing time (t) finally exceeds the predetermined time (te), the routine proceeds to step 406 where supply of secondary air is switched to "OFF" and stops. Then, at step 407, the timer is turned to "OFF" and the counted time (t) is cleared.

Due to the above-described control, secondary air is supplied for a predetermined period of time to the first catalyst of lean NOx catalyst so that condensation of water is prevented.

Also, though vapour tends to be condensed immediately after start-up of engine in cold conditions, due to the control of FIG. 9 exhaust gas is caused to bypass the lean NOx catalyst during warming-up of the engine so that condensation of water is prevented.

Operation and advantages of the exhaust gas purification system of the invention will now be explained.

In the first through third embodiments, since the flow switching valve 14 is controlled so as to cause exhaust gas to flow through the third catalyst 8 of oxidizing or three-way catalyst during warming-up of the engine and since the third catalyst 8 is located close to the exhaust manifold 4, the third catalyst 8 is quickly warmed-up so that HC and CO emissions are effectively purified. Also, the flow switching valve 14 is controlled so as to cause exhaust gas to flow through the first catalyst 10 of lean NOx catalyst after the engine has been warmed-up, NOx and a portion of HC and CO emissions are purified by the lean NOx catalyst and the remaining portion of HC and CO emissions which could not be purified by the lean NOx catalyst is purified by the second catalyst 12 located downstream of the first catalyst 10.

In a case where the first passage and the second passage are arranged so as to contact each other as was illustrated in the second and third embodiments, a catalytic converter including the first through third catalysts can be designed compact and a good warming-up characteristic of one catalyst surrounded by the other catalyst is obtained.

Further, in a case where secondary air is supplied to a portion of the first passage upstream of the lean NOx catalyst for a predetermined period of time as was illustrated in the fourth embodiment, condensation of vapour on the lean NOx catalyst and catalyst deterioration due to the condensate water are well prevented.

Although a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An exhaust gas purification system for an internal combustion engine comprising:
   an internal combustion engine capable of fuel combustion at lean air-fuel ratios and having an exhaust manifold and an exhaust conduit connected to the exhaust manifold, wherein the engine operates at one of a stoichiometric air-fuel ratio and a rich air-fuel ratio while it is being warmed-up and wherein the engine operates at a lean air-fuel ratio after it has been warmed-up;
   a dual passage portion provided in the exhaust conduit and located downstream of and close to the exhaust manifold of the engine, the dual passage portion including a first passage and a second passage which are connected in parallel to each other;
   a first $NO_x$ reducing catalyst installed in the first passage and constructed of zeolite carrying Copper to reduce nitrogen oxides included in exhaust gas from the engine under oxidizing gas conditions and in the presence of hydrocarbons;
   a second catalyst installed in the first passage downstream of the first catalyst and constructed of one of a three-way catalyst and an oxidizing catalyst;
   a third catalyst installed in the second passage and constructed of one of a three-way catalyst and an oxidizing catalyst, wherein said third catalyst is located within the second passage such that the temperature of the exhaust gas passing through the second passage is not affected by prior catalytic contact;
   a flow switching valve for switching flow of exhaust gas from the engine between the first passage and the second passage; and
   valve control means for switching the flow switching valve so as to cause exhaust gas to flow through the second passage while the engine is being warmed-up and while the engine is operating at one of a stoichiometric air-fuel ratio and a rich air-fuel ratio and to cause exhaust gas to flow through the first passage after the engine has been warmed-up and when the engine is operating at a lean air-fuel ratio.

2. A system according to claim 1, wherein the first passage and the second passage of the dual passage portion are spaced apart at longitudinally intermediate portions of the first passage and the second passage.

3. A system according to claim 1, wherein the second passage surrounds the first passage so that the third catalyst surrounds the first catalyst and the second catalyst.

4. A system according to claim 1, wherein the first passage surrounds the second passage so that the first catalyst and the second catalyst surround the third catalyst.

5. A system according to claim 1 and further comprising a fourth, three-way, catalyst installed downstream of the dual passage portion.

6. A system according to claim 1 and further comprising an exhaust gas recirculation system and an EGR control routine, wherein EGR is set to "ON" at high exhaust gas temperature and at medium engine loads.

7. A system according to claim 6 and further comprising a fuel injection control routine, wherein a fuel injection amount modification factor KLEAN is selected to be larger when EGR is set at "ON" than when EGR is set at "OFF".

8. A system according to claim 7, wherein the valve control means includes a flow switching valve control routine wherein
   (a) when a current engine cooling water temperature is equal to or higher than a predetermined temperature and the fuel injection amount modification factor is smaller than 1.0, the flow switching valve is switched to cause exhaust gas to flow through the first catalyst and the second catalyst, and
   (b) when the current engine cooling water temperature is lower than the predetermined temperature and when the current engine cooling water temperature is equal to or higher than the predetermined temperature and the fuel injection amount modification factor is equal to or larger than 1.0, the flow switching valve is switched to cause exhaust gas to flow through the third catalyst.

* * * * *